(12) United States Patent
Yakumaru et al.

(10) Patent No.: US 10,550,486 B2
(45) Date of Patent: Feb. 4, 2020

(54) ELECTROCHEMICAL HYDROGEN PUMP

(71) Applicant: Panasonic Intellectual Property Management Co., Ltd., Osaka (JP)

(72) Inventors: Yuuichi Yakumaru, Osaka (JP); Atsuo Okaichi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/423,586

(22) Filed: Feb. 3, 2017

(65) Prior Publication Data

US 2017/0233878 A1    Aug. 17, 2017

(30) Foreign Application Priority Data

Feb. 16, 2016    (JP) .................................. 2016-026785

(51) Int. Cl.

| | | |
|---|---|---|
| *C25B 9/08* | (2006.01) | |
| *C25B 1/02* | (2006.01) | |
| *F04B 45/047* | (2006.01) | |
| *B01D 53/32* | (2006.01) | |
| *H01M 8/04* | (2016.01) | |

(Continued)

(52) U.S. Cl.
CPC .............. *C25B 9/08* (2013.01); *B01D 53/326* (2013.01); *C25B 1/02* (2013.01); *F04B 45/047* (2013.01); *H01M 8/04171* (2013.01); *H01M 8/1018* (2013.01); *B01D 2256/16* (2013.01); *H01M 8/0687* (2013.01)

(58) Field of Classification Search
CPC ........... C25B 1/02; C25B 9/08; B01D 53/326; B01D 2256/16; F04B 45/047; H01M 8/04171; H01M 8/1018; H01M 8/0687
See application file for complete search history.

(56) References Cited

U.S. PATENT DOCUMENTS 4,434,116 A  *  2/1984  Covitch ............... B01D 67/003
                                                  264/101
2004/0253494 A1  12/2004  Maruyama et al.
(Continued)

FOREIGN PATENT DOCUMENTS

JP    2015-117139        6/2015
WO   2014/207388 A1    12/2014

OTHER PUBLICATIONS

The Extended European Search Report dated Jul. 18, 2017 for the related European Patent Application No. 17154531.2.
(Continued)

*Primary Examiner* — Ciel P Thomas
(74) *Attorney, Agent, or Firm* — McDermott Will & Emery LLP

(57) ABSTRACT

An electrochemical hydrogen pump includes: an electrolyte membrane; a cathode catalyst layer provided on one principal surface of the electrolyte membrane; an anode catalyst layer provided on the other principal surface of the electrolyte membrane; a pair of separators which include gas flow paths and which are provided so as to sandwich the cathode catalyst layer and the anode catalyst layer; and a voltage application portion applying a voltage between the cathode catalyst layer and the anode catalyst layer. In the electrochemical hydrogen pump, the one principal surface is disposed at an upper side in the gravity direction, and the cathode catalyst layer has a hydrophilic property.

4 Claims, 4 Drawing Sheets

(51) Int. Cl.
*H01M 8/10* (2016.01)
*H01M 8/06* (2016.01)
*H01M 8/04119* (2016.01)
*H01M 8/1018* (2016.01)
*H01M 8/0662* (2016.01)

(56) References Cited

U.S. PATENT DOCUMENTS

| | | | | |
|---|---|---|---|---|
| 2013/0257199 | A1* | 10/2013 | Perry | B01D 53/326 310/55 |
| 2015/0064606 | A1* | 3/2015 | Dekempeneer | H01M 8/0293 429/516 |
| 2015/0240368 | A1* | 8/2015 | Iacopetti | C25B 1/02 205/630 |
| 2017/0226647 | A1* | 8/2017 | Benetton | C25B 1/30 |

OTHER PUBLICATIONS

M-T Nguyen et al: "Characterisation of a electrochemical hydrogen pump using electrochemical impedance spectroscopy", Journal of Applied Electrochemistry, Kluwer Academic Publishers, DO, vol. 41, No. 9, Aug. 23, 2011 (Aug. 23, 2011), pp. 1033-1042, XP019945660.
Grigoriev S A et al: "Description and characterization of an electrochemical hydrogen compressor/concentrator based on solid polymer electrolyte technology", International Journal of Hydrogen Energy, Elsevier Science Publishers B.V., Barking, GB, vol. 36, No. 6, Aug. 14, 2010 (Aug. 14, 2010), pp. 4148-4155, XP028172870.
Communication pursuant to Article 94(3) EPC dated Dec. 14, 2018 for the related European Patent Application No. 17154531.2.

\* cited by examiner

ELECTROCHEMICAL HYDROGEN PUMP

BACKGROUND

1. Technical Field

The present disclosure relates to an electrochemical hydrogen pump.

2. Description of the Related Art

In recent years, because of environmental issues, such as the global warming, and energy issues, such as depletion of oil resources, many attentions have been paid on a hydrogen gas as a clean alternative energy source instead of a fossil fuel. By combustion of a hydrogen gas, water is only emitted, and carbon dioxide, nitride oxides, and the like, each of which causes the global warming, are not emitted; hence, a hydrogen gas is expected as a clean energy source. As a device using a hydrogen gas as fuel, for example, a fuel cell may be mentioned, and for automobile power generation and in-house power generation, a fuel cell has been increasingly developed and spread. In addition, in a coming hydrogen society, technical development has been desired in which, besides hydrogen gas manufacturing, a hydrogen gas can be stored at a high density, and a small volume thereof can be transported or used at a low cost. Furthermore, in order to promote the spread of fuel cells, the infrastructure of fuel supply is required to be well organized. Hence, various proposals have been made in order to obtain a highly pure hydrogen gas by refining.

For example, Japanese Unexamined Patent Application Publication No. 2015-117139 has disclosed a hydrogen refining and pressure-boosting system in which by application of a voltage between an anode and a cathode with an electrolyte membrane provided therebetween, refining and pressure-boosting of a hydrogen gas are carried out. In addition, a laminate structure having an anode, an electrolyte membrane, and a cathode is called a membrane electrode assembly (hereinafter, abbreviated as "MEA").

In this case, when a current flows between the anode and the cathode, protons move together with water molecules from the anode to the cathode through the electrolyte membrane. As a result, water (osmotic water) is generated from the water molecules on the cathode. Hence, according to Japanese Unexamined Patent Application Publication No. 2015-117139, in order to efficiently separate this water from a hydrogen gas, a water trap/drain unit is provided in a hydrogen gas flow path. The water trap/drain unit includes a pair of water traps provided with a drain valve. The hydrogen refining and pressure-boosting system disclosed in Japanese Unexamined Patent Application Publication No. 2015-117139 is formed in such a way that since the water traps are alternately switched so as to drain water out of the hydrogen gas flow path, water in the hydrogen flow path can be removed at an appropriate time even when the hydrogen refining and pressure-boosting system is continuously operated. Hence, highly pure hydrogen can be obtained by refining.

SUMMARY

However, in the related example, problems which may arise when the water trap/drain unit is provided in the hydrogen gas flow path have not been sufficiently investigated. In consideration of the situation as described above, one non-limiting and exemplary embodiment provides an electrochemical hydrogen pump which is able to perform refining and pressure-boosting of a hydrogen gas by a simple structure as compared to that in the past.

In order to solve the problems described above, in one general aspect, the techniques disclosed here feature an electrochemical hydrogen pump including: an electrolyte membrane; a cathode catalyst layer provided on one principal surface of the electrolyte membrane; an anode catalyst layer provided on the other principal surface of the electrolyte membrane; a pair of separators which include gas flow paths and which are provided so as to sandwich the cathode catalyst layer and the anode catalyst layer; and a voltage application portion applying a voltage between the cathode catalyst layer and the anode catalyst layer. In the electrochemical hydrogen pump described above, the one principal surface is disposed at an upper side in the gravity direction, and the cathode catalyst layer has a hydrophilic property.

The electrochemical hydrogen pump according to one aspect of the present disclosure is able to perform refining and pressure-boosting of a hydrogen gas by a simple structure as compared to that in the past.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
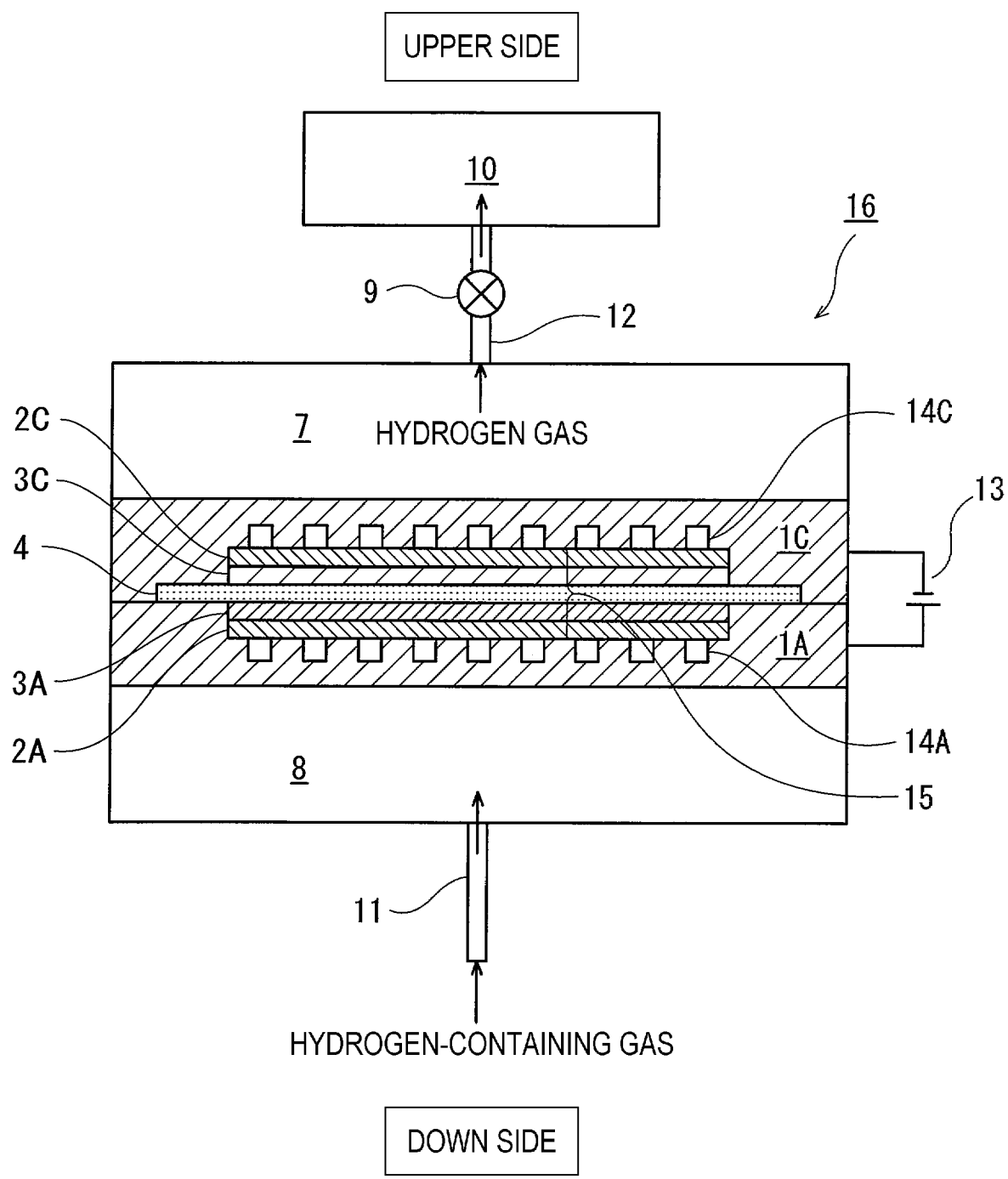
FIG. 1 is a view showing one example of an electrochemical hydrogen pump according to an embodiment.

Through intensive research carried out on the problems arising when a water trap/drain unit is provided in a hydrogen gas flow path, the following was found.

In order to remove water in a hydrogen gas, when a water trap/drain unit is provided as is the related example, the size of the system is inevitably increased. In addition, since the reliability of the water trap/drain unit is required to be secured, the cost of the system may be unfavorably increased in some cases.

Accordingly, the present inventors finally conceived that in order to maintain the electrolyte membrane of MEA in a wet state, instead of draining osmotic water of the cathode of MEA, the osmotic water is effectively used.

That is, an electrochemical hydrogen pump according to one aspect of the present disclosure comprises: an electrolyte membrane; a cathode catalyst layer provided on one principal surface of the electrolyte membrane; an anode catalyst layer provided on the other principal surface of the electrolyte membrane; a pair of separators which include gas flow paths and which are provided so as to sandwich the cathode catalyst layer and the anode catalyst layer; and a voltage application portion applying a voltage between the cathode catalyst layer and the anode catalyst layer. In the electrochemical hydrogen pump described above, the one principal surface is disposed at an upper side in the gravity direction, and the cathode catalyst layer has a hydrophilic property.

According to the structure as described above, refining and pressure-boosting of a hydrogen gas can be performed by a simple structure as compared to that in the past. In particular, at a cathode side of MEA, osmotic water is generated from water molecules passing through the electrolyte membrane. Hence, when the cathode catalyst layer is formed to have a hydrophilic property, and in addition, when the cathode catalyst layer is disposed at an upper side than the electrolyte membrane so that the osmotic water moves to an electrolyte membrane side and uniformly wets the electrolyte membrane, the wet state of the electrolyte membrane of MEA can be appropriately maintained. As a result, since the osmotic water is effectively used, the degree of requirement to provide a related water trap/drain unit can be reduced. In addition, even in the case in which the water trap/drain unit is provided, the water trap/drain unit may be simply formed (for example, the size thereof may be reduced).

In addition, compared to the case in which the structure described above is not used, water is allowed to stay on the principal surface (upper surface) of the electrolyte membrane, and the water retention property thereof can be uniformly maintained; hence, for example, degradation of the electrolyte membrane and increases of the membrane resistance thereof and the reaction overvoltage can be appropriately suppressed. Hence, energy required for refining and pressure-boosting of a hydrogen gas can be reduced.

In addition, since the electrolyte membrane can be effectively cleaned when being dipped in water, degradation of the membrane caused by impurity accumulation on the electrolyte membrane can be suppressed.

Hereinafter, the embodiment of the present disclosure will be described in detail with reference to the drawings.

In addition, the embodiment which will be described below shows a comprehensive and concrete example. The numerical values, the shapes, the materials, the constituent elements, the arrangement thereof and the connection therebetween, and the like in the following embodiment are simply described by way of example and are not intended to limit the present disclosure. In addition, among the constituent elements of the following embodiment, the constituent element which is not described in the independent claim showing the most generic concept will be described as an arbitrary constituent element.

(Embodiment)
[Device Structure]

Figure 2:
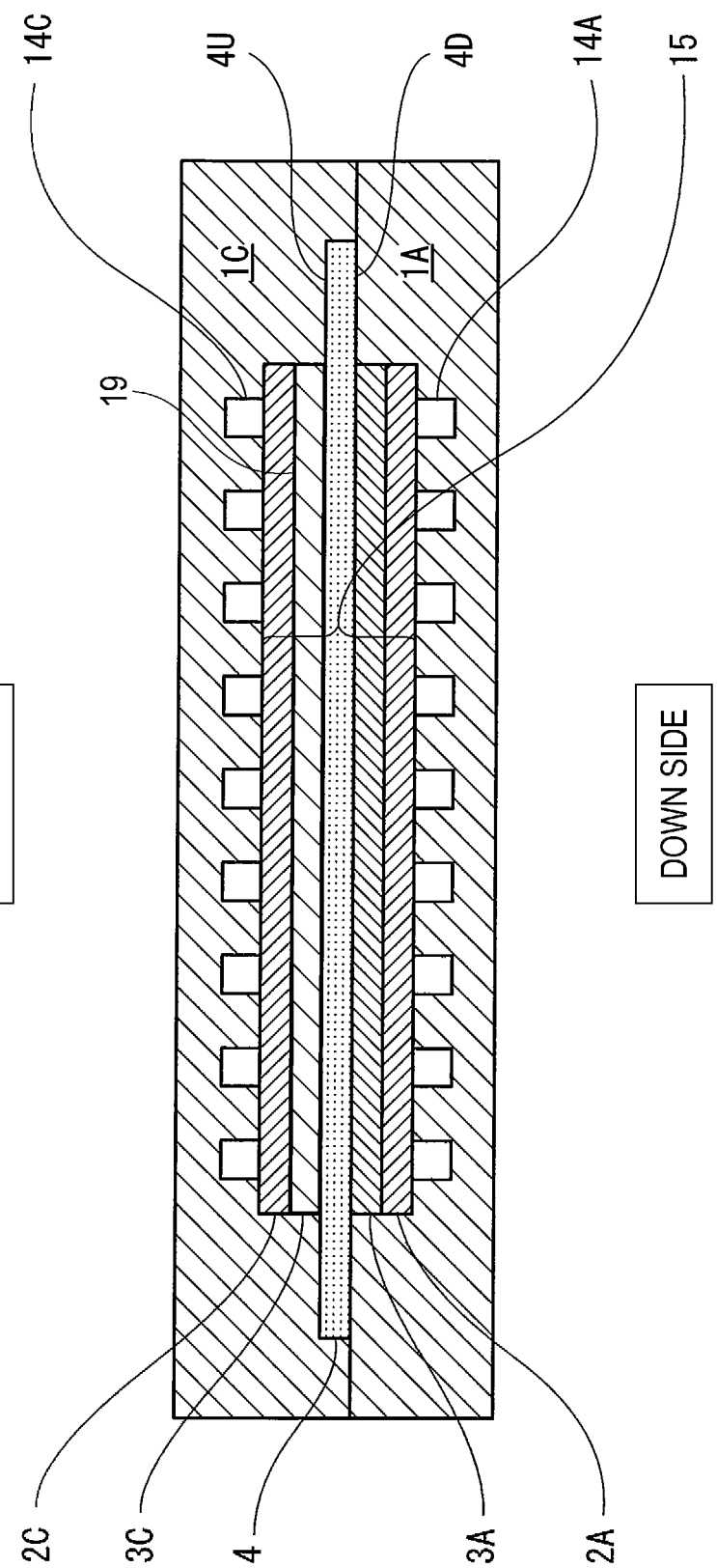
FIG. 2 is a view showing one example of the electrochemical hydrogen pump according to the embodiment.

FIGS. 1 and 2 are each a schematic view showing one example of an electrochemical hydrogen pump according to an embodiment. In addition, in FIGS. 1 and 2, the positions of "upper side" and "down side" are as shown in the drawings, and it is to be understood that the gravity acts in the direction from the "upper side" to the "down side".

An electrochemical hydrogen pump 16 includes an electrolyte membrane 4, a cathode catalyst layer 3C, an anode catalyst layer 3A, a cathode gas diffusion layer 2C, an anode gas diffusion layer 2A, a pair of separators 1C and 1A, and a voltage application portion 13.

As shown in FIG. 2, the electrolyte membrane 4 has a pair of principal surfaces 4U and 4D. The one principal surface 4U of the electrolyte membrane 4 is an upper surface (front surface), and the other principal surface 4D of the electrolyte membrane 4 is a down surface (rear surface).

The electrolyte membrane 4 is a proton conductive high molecular weight membrane which enables a proton ($H^+$) to pass therethrough. Any membrane may be used as the electrolyte membrane 4 as long as being a proton conductive high molecular weight membrane. For example, as the electrolyte membrane 4, a fluorinated high molecular weight electrolyte membrane or the like may be mentioned. In particular, Nafion (registered trade name, manufactured by du Pont) or Aciplex (product name, manufactured by Asahi Kasei Corp.) may be mentioned by way of example.

The cathode catalyst layer 3C is provided on the principal surface 4U of the electrolyte membrane 4. The cathode catalyst layer 3C contains, for example, platinum as a catalyst metal, but the catalyst metal is not limited thereto.

The anode catalyst layer 3A is provided on the other principal surface 4D of the electrolyte membrane 4. The anode catalyst layer 3A contains, for example, RuIrFeOx as a catalyst metal, but the catalyst metal is not limited thereto.

In addition, as a method for preparing a catalyst used for the cathode catalyst layer 3C or the anode catalyst layer 3A, various methods may be mentioned, and the method is not particularly limited. For example, as a catalyst carrier, an electrically conductive porous material powder or a carbon-based powder may be mentioned. As the carbon-based powder, for example, a powder formed of graphite, carbon black, or activated carbon having an electrical conductivity may be mentioned. A method for supporting platinum or another catalyst metal on a carrier, such as carbon, is not particularly limited. For example, a powder mixing method or a liquid phase mixing method may be used. As the latter liquid phase mixing method, for example, a method in which a carrier, such as carbon, is dispersed in a catalyst component colloid liquid so that the catalyst component is adsorbed on the carrier may be mentioned. In addition, platinum or another catalyst metal may also be supported by using, if needed, an active oxygen-removed material as a carrier by a method similar to that described above. The support state of a catalyst metal, such as platinum, on a carrier is not particularly limited. For example, after being pulverized into fine particles, the catalyst metal may be supported on a carrier in a highly dispersed state.

The cathode gas diffusion layer 2C is provided on the cathode catalyst layer 3C. The cathode gas diffusion layer 2C is required to have rigidity so as to withstand the press of the electrolyte membrane 4 at a high pressure. As the cathode gas diffusion layer 2C, for example, there may be used a paper-shaped layer formed, for example, of a porous body obtained by performing platinum plating on the surface of graphitized carbon fibers having a high modulus or the surface of a titanium powder sintered body. In addition, in the former case, for example, when carbon fibers are heat-treated at 2,000° C. or more, the graphite crystal is grown, and the carbon fibers are changed into graphite fibers.

The anode gas diffusion layer 2A is provided on the anode catalyst layer 3A. The anode gas diffusion layer 2A is required to have rigidity so as to withstand the press of the electrolyte membrane 4 at a high pressure. As the anode gas diffusion layer 2A, for example, there may be used an electrically conductive porous body formed by performing platinum plating on the surface of a titanium fiber sintered body or a titanium powder sintered body.

As described above, an MEA 15 includes the electrolyte membrane 4, the cathode catalyst layer 3C and the anode catalyst layer 3A provided on a pair of the principal surfaces 4U and 4D of the electrolyte membrane 4, respectively, the cathode gas diffusion layer 2C provided on the upper surface of the cathode catalyst layer 3C, and the anode gas diffusion layer 2A provided on the down surface of the anode catalyst layer 3A. In addition, those layers are bonded to each other in a laminate state.

The separator 1C has a gas flow path 14C and is a member to supply a gas to the cathode catalyst layer 3C and/or the cathode gas diffusion layer 2C. The separator 1A has a gas flow path 14A and is a member to supply a gas to the anode catalyst layer 3A and/or the anode gas diffusion layer 2A. The separators 1C and 1A each include the gas flow path and are provided so as to sandwich the cathode catalyst layer 3C and the anode catalyst layer 3A. In particular, in the separator 1C, for example, a serpentine-shaped gas flow path 14C is formed in a plan view, and a region in which this gas flow path 14C is formed is disposed so as to be in contact with the upper surface of the cathode gas diffusion layer 2C. In the separator 1A, for example, a serpentine-shaped gas flow path 14A is formed in a plan view, and a region in which this gas flow path 14A is formed is disposed so as to be in contact with the down surface of the anode gas diffusion layer 2A. In addition, since the separators 1C and 1A sandwich the upper and the down surfaces of MEA 15, respectively, a single cell of the electrochemical hydrogen pump 16 is obtained.

The voltage application portion 13 applies a voltage between the cathode catalyst layer 3C and the anode catalyst layer 3A. In particular, a plus terminal of the voltage application portion 13 is connected to the electrically conductive separator 1A, and a minus terminal of the voltage application portion 13 is connected to the electrically conductive separator 1C. The voltage application portion 13 is not particularly limited as long as capable of applying a voltage between the cathode catalyst layer 3C and the anode catalyst layer 3A.

In addition, the cathode gas diffusion layer 2C and the anode gas diffusion layer 2A are electricity feeding members for the cathode and the anode of MEA 15, respectively. The cathode gas diffusion layer 2C functions to allow a current to pass between the separator 1C and the cathode catalyst layer 3C, and the anode gas diffusion layer 2A functions to allow a current to pass between the separator 1A and the anode catalyst layer 3A.

In addition, the cathode gas diffusion layer 2C also functions to diffuse a gas between the gas flow path 14C of the separator 1C and the cathode catalyst layer 3C, and the anode gas diffusion layer 2A also functions to diffuse a gas between the gas flow path 14A of the separator 1A and the anode catalyst layer 3A. For example, a hydrogen-containing gas flowing through the gas flow path 14A of the separator 1A diffuses to the surface of the anode catalyst layer 3A through the anode gas diffusion layer 2A.

In addition, a stack may be formed from a plurality of single cells in such a way that if needed, a single cell of the electrochemical hydrogen pump 16 is provided with a cooler or the like, and at least two cells are laminated to each other.

As shown in FIG. 1, the electrochemical hydrogen pump 16 includes an anode chamber 8 and a cathode chamber 7.

The inside of the anode chamber 8 is communicated with an anode inlet pipe 11 and is also communicated with the gas flow path 14A of the separator 1A with a fluid flow path (such as a pipe or a manifold) which is not shown in the drawing and which is provided therebetween. Accordingly, a hydrogen-containing gas flowing through the anode inlet pipe 11 flows into the anode chamber 8 and is then supplied to the gas flow path 14A of the separator 1A. In addition, the hydrogen-containing gas contains at least a hydrogen gas and water molecules (water steam). As the hydrogen-containing gas, for example, a modified gas or a gas generated by a water electrolytic method may be mentioned.

The inside of the cathode chamber 7 is communicated with a cathode outlet pipe 12 and is also communicated with the gas flow path 14C of the separator 1C with a fluid flow path (such as a pipe or a manifold) which is not shown in the drawing and which is provided therebetween. Accordingly, a highly pure hydrogen gas passing through MEA 15 flows into the cathode chamber 7 through the gas flow path 14C of the separator 1C and is then supplied to the cathode outlet pipe 12. In addition, the cathode outlet pipe 12 is provided with an on-off valve 9 (such as a solenoid valve), and when the on-off valve 9 is opened and closed at an appropriate time, a hydrogen gas is stored in a high pressure hydrogen tank 10. In addition, the hydrogen gas thus stored is to be used as a fuel or the like of a hydrogen-using apparatus (such as a fuel cell automobile) not shown.

In addition, in the electrochemical hydrogen pump 16 of this embodiment, when the gravity acts in the direction from the upper side to the down side, the one principal surface 4U of the electrolyte membrane 4 is an upper surface, and the cathode catalyst layer 3C has a hydrophilic property. The hydrophilic property of the cathode catalyst layer 3C is preferably greater than the hydrophilic property of the anode catalyst layer 3A. In addition, when the surface of the cathode catalyst layer 3C is processed by a desired surface treatment to form a water retention layer 19 (see FIG. 2), the hydrophilic property of the cathode catalyst layer 3C can be appropriately improved. The detail of the surface treatment will be described in the example.

Figure 3:
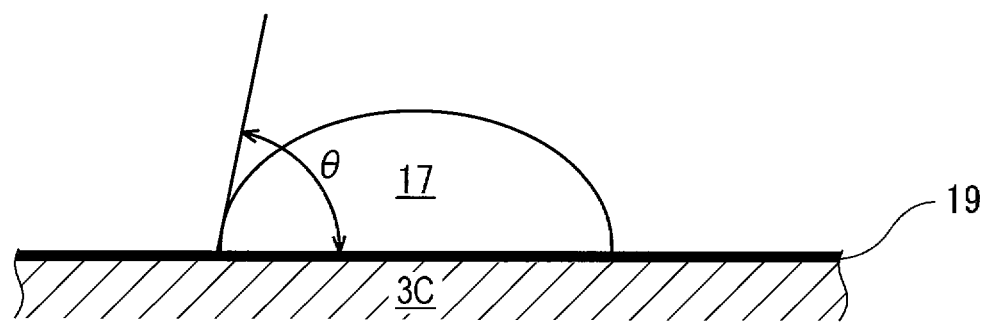
FIG. 3 is a view illustrating an evaluation index of a hydrophilic property of a cathode catalyst layer.

In addition, in this embodiment, as shown in FIG. 3, a water droplet 17 is dripped on the cathode catalyst layer 3C, and the angle (contact angle θ) formed between the surface of the catalyst layer of the cathode catalyst layer 3C and the tangent line of the water droplet 17 is used as an evaluation index of the hydrophilic property of the cathode catalyst layer 3C. In this case, when this contact angle θ is approximately 90° or less, it is evaluated that the cathode catalyst layer 3C has a hydrophilic property.

As described above, the electrochemical hydrogen pump 16 of this embodiment is able to perform refining and pressure-boosting of a hydrogen gas by a simple structure as compared to that in the past. In particular, at the cathode side of MEA 15, osmotic water is generated from water molecules passing through the electrolyte membrane 4. Accordingly, when the hydrophilic property of the cathode catalyst layer 3C is set greater than that of the anode catalyst layer 3A, and at the same time, when the cathode catalyst layer 3C is disposed at an upper side than that of the electrolyte membrane 4 so that the osmotic water moves to the electrolyte membrane 4 side and uniformly wets the electrolyte membrane 4, the wet state of the electrolyte membrane 4 of MEA 15 can be appropriately maintained. As a result, since the osmotic water is effectively used, the degree of requirement to provide a related water trap/drain unit can be reduced. In addition, even in the case in which the water trap/drain unit is provided, the water trap/drain unit may be simply formed (for example, the size thereof may be reduced in some cases).

In addition, compared to the case in which the above structure is not used, since water can be allowed to stay on the principal surface 4U (upper surface) of the electrolyte membrane 4, and the water retention property of the electrolyte membrane 4 is uniformly maintained, the degradation of the electrolyte membrane 4 and the increases of the membrane resistance of the electrolyte membrane 4 and the reaction overvoltage can be appropriately suppressed. Hence, energy required for refining and pressure-boosting of a hydrogen gas can be reduced.

In addition, since the electrolyte membrane 4 can be effectively cleaned when being dipped in water, the membrane degradation caused by impurity accumulation on the electrolyte membrane 4 can be suppressed.

In addition, since the anode of MEA 15 is the electrode located at the down side of MEA 15 in the direction in which the gravity acts, water is not likely to stay on the anode catalyst layer 3A. Hence, since the increase of the reaction resistance at the anode, which may occur when hydrogen is dissociated into a proton and an electron, can be suppressed, the increase of a consumption electric power necessary for refining and pressure-boosting of a hydrogen gas of the electrochemical hydrogen pump 16 can be suppressed.

[Operation]

Figure 4:
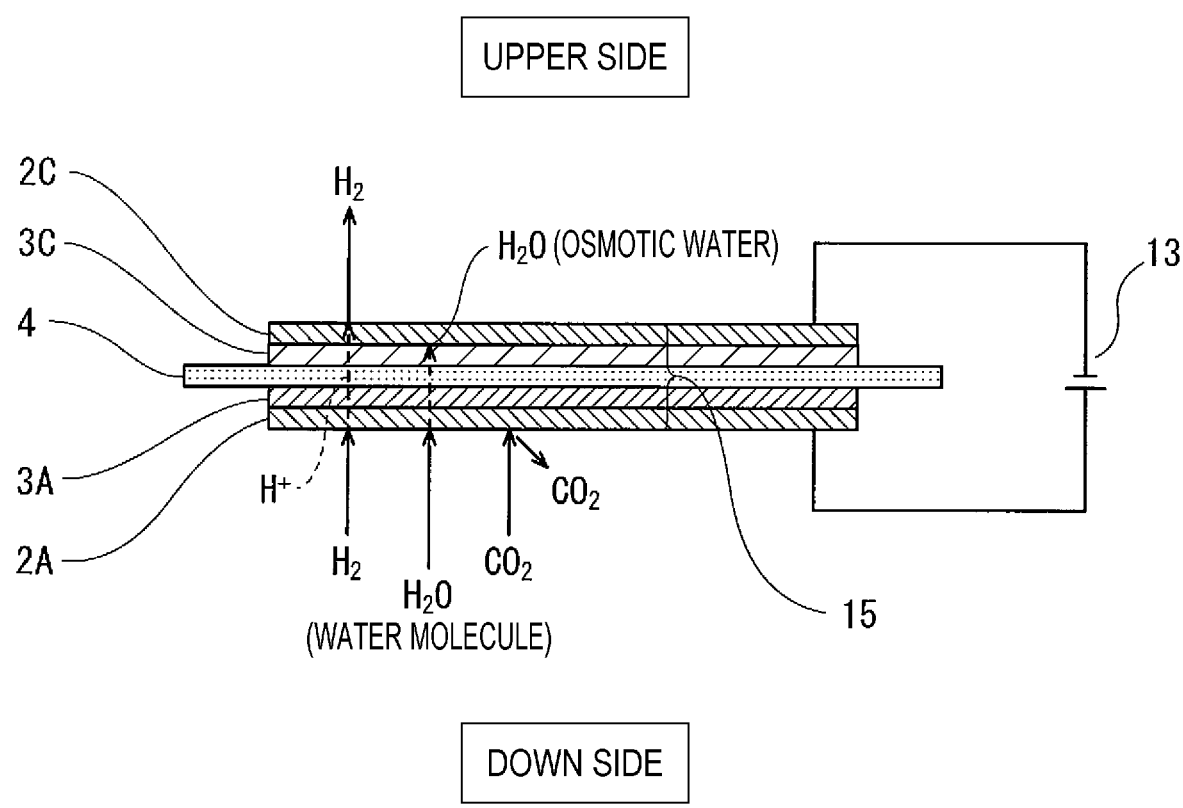
FIG. 4 is a view illustrating the operation of the electrochemical hydrogen pump according to the embodiment.

FIG. 4 is a view illustrating the operation of the electrochemical hydrogen pump according to the embodiment.

In addition, the following operation may be performed in accordance with a control program of a control device not shown in the drawing. The control device may have any structure as long as having a control function. The control device includes, for example, a computing circuit and a storage circuit storing a control program. As the computing circuit, for example, an MPU and a CPU may be mentioned. As the storage circuit, for example, a memory may be mentioned. The control device may be formed of a single control device performing a centralized control or may be formed of a plurality of control units performing a decentralized control in cooperation with each other.

First, by the voltage application portion 13, a voltage is applied between the anode and the cathode of MEA 15.

Next, when a hydrogen-containing gas is supplied to the anode chamber 8 through the anode inlet pipe 11, a hydrogen gas in the hydrogen-containing gas releases an electron on the anode to form a proton ($H^+$) (Formula (1)). The electron thus released moves to the cathode through the voltage application portion 13.

On the other hand, as shown in FIG. 4, after passing through the electrolyte membrane 4 together with a water molecule, the proton is brought into contact with the cathode. On the cathode, a reduction reaction between the proton passing through the electrolyte membrane 4 and an electron from the cathode gas diffusion layer 2C occurs, so that a hydrogen gas is generated (Formula (2)).

Accordingly, a hydrogen-containing gas containing impurities such as a $CO_2$ gas is purified into a hydrogen gas at a high efficiency. That is, on the cathode, a hydrogen gas can only be extracted from the hydrogen-containing gas, and the impurities such as a $CO_2$ gas can be removed by MEA 15. In addition, the hydrogen-containing gas may contain as an impurity, a CO gas in some cases. In this case, since a CO gas degrades the catalyst activity of the anode catalyst layer 3A and the like, a CO gas is preferably removed by a CO remover (such as a modifier or a CO selectively oxidizing device) which is not shown in the drawing.

In addition, when the on-off valve 9 is closed, the pressure of a hydrogen gas in the cathode chamber 7 is increased, that is, the hydrogen gas pressure reaches a high level. In particular, the relationship between a gas pressure P1 of the anode, a gas pressure P2 of the cathode, and a voltage E of the voltage application portion 13 can be represented by the following formula (3).

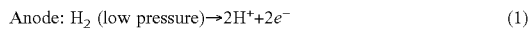

Anode: $H_2$ (low pressure)→$2H^+ + 2e^-$     (1)

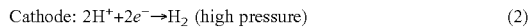

Cathode: $2H^+ + 2e^- →H_2$ (high pressure)     (2)

$$E=(RT/2F)\ln(P2/P1)+ir \quad (3)$$

In the formula (3), R represents the gas constant (8.3145 J/K·mol), T represents the temperature (K) of MEA 15, F represents Faraday constant (96,485 C/mol), P2 represents the gas pressure of the cathode, P1 represents the gas pressure of the anode, i represents the current density (A/cm$^2$), and r represents a cell resistance (Ω·cm$^2$).

From Formula (3), it is easily understood that when the voltage E of the voltage application portion 13 is increased, the gas pressure P2 of the cathode can be increased.

Hence, by the electrochemical hydrogen pump 16 according to this embodiment, when the on-off valve 9 is closed, and the voltage E of the voltage application portion 13 is increased, the hydrogen gas pressure in the cathode chamber 7 is increased. In addition, when the hydrogen gas pressure reaches a predetermined value or more, by opening the on-off valve 9, a hydrogen gas in the cathode chamber 7 is filled in the high pressure hydrogen tank 10 through the cathode outlet pipe 12. On the other hand, when the hydrogen gas pressure in the cathode chamber 7 is less than a predetermined value, by closing the on-off valve 9, the cathode chamber 7 is blocked from the high pressure hydrogen gas tank 10. As a result, a hydrogen gas in the high pressure hydrogen tank 10 is suppressed from reversely flowing into the cathode chamber 7.

As described above, by the electrochemical hydrogen pump 16, the pressure of a hydrogen gas is increased to a desired target value and is then filled in the high pressure hydrogen tank 10.

In addition, when the electrolyte membrane 4 is dried, the membrane resistance (IR resistance) and the reaction resistance (reaction overvoltage) at the dissociation of hydrogen into a proton and an electron are not only increased, but the membrane is also liable to be broken. However, in the electrochemical hydrogen pump 16 according to this embodiment, as described above, since the osmotic water of the cathode of MEA 15 is effectively used to maintain the wet state of the electrolyte membrane 4 thereof, the probability described above can be reduced.

EXAMPLE

Hereinafter, a concrete example of the surface treatment of the cathode catalyst layer 3C will be described.

A paste containing hydrophilic fine particles is coated on the surface of the cathode catalyst layer 3C and is then solidified. Accordingly, the hydrophilic property of the cathode catalyst layer 3C is improved, and the water retention property of the electrolyte membrane 4 can be improved. In addition, particles of zeolite, mordenite, or silica gel having moisture-absorption characteristics may be mixed with the catalyst of the cathode catalyst layer 3C.

As a coating method of the paste described above, for example, a wet coating method may be used. As the wet coating method, for example, there may be used a knife or a doctor blade coating method, an extrusion coating method, a slot coating method, or a roller coating method.

As the hydrophilic fine particles described above, for example, zirconium oxide particles may be mentioned. In this case, a paste is preferably a composition in which zirconium oxide particles are dispersed in a solution containing a pore forming polymer dissolved in a solvent.

As the pore forming polymer, for example, a polysulfone (PSU), a poly(vinylidene fluoride) (PVDF), a polyacrylonitrile (PAN), a poly(ethylene oxide) (PEO), a polymethylmethacrylate, or a copolymer thereof may be mentioned. A poly(vinylidene fluoride) (PVDF), a copolymer of vinylidene fluoride (VDF), or an organic polymer primarily formed of a poly(vinylidene fluoride) is particularly preferable in view of oxidation/reduction resistance and membrane forming characteristics. Among those polymers mentioned above, a terpolymer of vinylidene fluoride (VDF), hexafluoropropylene (HFP), and chlorotrifluoroethylene (CTFE) is preferable because of its swelling characteristics, thermal resistance, and adhesion to the electrode. As other preferable hydrophilic polymers, for example, there may be mentioned a poly(vinyl pyrrolidone) (PVP), a cross-linked poly(vinyl pyrrolidone) (PVPP), a poly(vinyl alcohol), a poly(vinyl acetate), a methyl cellulose, and a poly(ethylene oxide).

The paste may contain, for example, as a hydrophilizing and stabilizing agent, a polyalcohol, such as a poly(propylene glycol), glycerin, ethylene glycol, or tripropylene glycol; dibutyl phthalate (DBP), diethyl phthalate (DEP), diundecyl phthalate (DUP), isononanoic acid, or neodecanoic acid.

When the paste as described above is coated on the surface of the cathode catalyst layer 3C and is then solidified, osmotic water present on the cathode catalyst layer 3C does not form a spherical liquid droplet but forms a film shape having a contact angle θ of 90° or less as shown in FIG. 3. Accordingly, the wet state of the electrolyte membrane 4 can be appropriately maintained.

As described above, the degradation of the electrolyte membrane 4 is suppressed, and the decrease of the proton conductivity of the electrolyte membrane 4 can be suppressed. Hence, since the resistance (IR loss) of the electrolyte membrane 4 and the reaction resistance (reaction overvoltage) generated when hydrogen is dissociated into a proton and an electron can be maintained at a low level, the increase of a consumption electric power necessary for operation of the electrochemical hydrogen pump 16 for refining and pressure-boosting of a hydrogen gas can be suppressed.

In addition, for example, the above surface treatment method and material are simply described by way of example and are not limited to those described in this example.

MODIFIED EXAMPLE

According to an electrochemical hydrogen pump 16 of a modified example of the embodiment, in the electrochemical hydrogen pump 16 according to the aspect of the present disclosure, the hydrophilic property of the cathode catalyst layer 3C is greater than the hydrophilic property of the cathode gas diffusion layer 2C.

According to the structure as described above, osmotic water of the cathode of MEA 15 is more likely to stay on the electrolyte membrane 4. Hence, compared to the case in which the above structure is not used, the electrolyte membrane 4 can be maintained so as to have a high water retention property. In addition, in order to improve the hydrophilic property of the cathode gas diffusion layer 2C, the surface thereof may be processed by a surface treatment similar to that performed on the cathode catalyst layer 3C.

The electrochemical hydrogen pump 16 according to this modified example may be formed in a manner similar to that of the electrochemical hydrogen pump 16 of the embodiment except for the feature described above.

One aspect of the present disclosure can be used, for example, as an electrochemical hydrogen pump.

What is claimed is:

1. An electrochemical hydrogen pump comprising:
   an electrolyte membrane;
   a cathode catalyst layer provided on a first principal surface of the electrolyte membrane, the cathode catalyst layer including a cathode gas diffusion layer;
   an anode catalyst layer provided on a second principal surface of the electrolyte membrane, the anode catalyst layer including an anode gas diffusion layer;
   a pair of separators which include gas flow paths and which are provided so as to sandwich the cathode catalyst layer and the anode catalyst layer;
   an anode chamber which is in communication with the gas flow path of one of the separators of the pair of separators;
   a cathode chamber which is in communication with the gas flow path of the other separator of the pair of separators; and
   a voltage application portion applying a voltage between the cathode catalyst layer and the anode catalyst layer,
   wherein the first principal surface is disposed at an upper side in the gravity direction, and
   the cathode catalyst layer has a hydrophilic property,
   wherein the cathode catalyst layer comprises hydrophilic particles and a pore forming polymer on a surface of the cathode catalyst layer provided by treating the surface of the cathode catalyst layer with a paste containing the hydrophilic particles and the pore forming polymer and solidifying the paste,
   wherein one of the separators of the pair of separators is located between the anode gas diffusion layer and the anode chamber and the other separator of the pair of separators is located between the cathode gas diffusion layer and the cathode chamber,
   wherein the pore forming polymer is selected from the group consisting of a polysulfone (PSU), a poly(vinylidene fluoride) (PVDF), a polyacrylonitrile (PAN), a polyethylene oxide) (PEO), a polymethylmethacrylate, and a copolymer thereof,
   wherein the paste further contains a compound selected from the group consisting of polypropylene glycol), glycerin, ethylene glycol, tripropylene glycol, dibutyl phthalate (DBP), diethyl phthalate (DEP), diundecyl phthalate (DUP), isononanoic acid, and neodecanoic acid.

2. The electrochemical hydrogen pump according to claim 1, wherein the cathode catalyst layer has a contact angle of 90 or less.

3. The electrochemical hydrogen pump according to claim 1, wherein a hydrophilic property of the cathode catalyst layer is greater than the hydrophilic property of the anode catalyst layer.

4. The electrochemical hydrogen pump according to claim 1, wherein a hydrophilic property of the cathode catalyst layer is greater than the hydrophilic property of the cathode gas diffusion layer.

* * * * *